(12) United States Patent
Carnall

(10) Patent No.: US 7,575,021 B2
(45) Date of Patent: Aug. 18, 2009

(54) GAS PRESSURE REGULATOR

(75) Inventor: Martin Carnall, Barwell (GB)

(73) Assignee: Black Market Sportz Limited, Warwickshire (GB)

( * ) Notice: Subject to any disclaimer, the term of this patent is extended or adjusted under 35 U.S.C. 154(b) by 104 days.

(21) Appl. No.: 11/294,120

(22) Filed: Dec. 5, 2005

(65) Prior Publication Data

US 2006/0137745 A1    Jun. 29, 2006

(30) Foreign Application Priority Data

Dec. 23, 2004  (GB) ................................ 0428167.1

(51) Int. Cl.
*G05D 16/02* (2006.01)
(52) U.S. Cl. .................. 137/505.25; 137/508
(58) Field of Classification Search ............ 137/505.11, 137/505.25, 505.28, 508; 251/344
See application file for complete search history.

(56) References Cited

U.S. PATENT DOCUMENTS

| 2,753,887 | A | * | 7/1956 | Meincke | 137/505.25 |
| 2,997,059 | A | * | 8/1961 | Mortimer | 137/505.13 |
| 3,211,175 | A | * | 10/1965 | Replogle | 137/505.28 |
| 3,298,392 | A | * | 1/1967 | Wilcox | 137/505.25 |
| 4,083,380 | A | * | 4/1978 | Huber | 137/505.25 |
| 4,924,904 | A | * | 5/1990 | Carter | 137/505.11 |
| 2004/0007269 | A1 | * | 1/2004 | Larsen | 137/505.25 |
| 2004/0183044 | A1 | * | 9/2004 | Wears | 251/206 |

* cited by examiner

*Primary Examiner*—Stephen M Hepperle
(74) *Attorney, Agent, or Firm*—Caesar, Rivise, Bernstein, Cohen & Pokotilow

(57) ABSTRACT

A gas pressure regulator of the kind in which a valve member is spring biased to the valve-open position and is moved to the valve-closed position when upstream pressure at an outlet overcomes the spring is arranged such that gas pressure at an inlet end of the valve member 12 does not influence it in the valve-opening direction. In the embodiment of FIGS. 3 and 4 a bottom end of the valve member receives a piston-like plug. Openings in the wall of the valve member are occluded when the valve is closed. In the open position of the valve member pressure is equal all round each opening. In another embodiment of the invention a spool is provided having one enlarged end within the valve member and another outside it. Pressure on the combined surfaces of the end and the end of the valve member is equal to the pressure on the end of the spool.

6 Claims, 3 Drawing Sheets

GAS PRESSURE REGULATOR

This Application claims priority from British Patent Application No. 0428167.1 filed Dec. 23, 2004.

FIELD OF THE INVENTION

This invention relates to an improved gas pressure regulator.

BACKGROUND OF THE INVENTION

Nearly all systems using a gas supply need the utility to which the gas is being supplied to have a regulator. The function of the regulator is to prevent wide variations in the pressure being supplied and in particular to shut off the supply if the pressure is too high. A regulator is especially needed when the source of the gas is a container in which gas is stored at high pressure to ensure that excessive pressure will not be experienced within a utility connected to the container.

FIGS. 1 and 2 of the accompanying drawings illustrate a known regulator respectively in the valve-open and the valve-closed position. A housing 10 has a through bore 11 in which a tubular valve member 12 is moveable. The valve member has an enlarged upper end 13 which, in the valve-open position of FIG. 1, abuts against a shoulder 14 in the bore 11. Surrounding the lower end of the valve member 12 within the bore 11 is an adjustment cylinder 15. This is axially moveable by a nut 16 engaging screw threads in a lower portion of the bore 11 to adjust the loading of a spring 17 in compression between the undersurface of the enlargement 13 and the cylinder 15. The housing 10 has a lateral inlet 18 for connection to a source of gas under pressure (not shown) such as a canister of compressed air. The upper end of the bore 11 provides an outlet 19 for connection to a utility (not shown) such as a paintball gun to which compressed air is to be supplied from the canister.

Gas pressure at the outlet 19 acts on the surface of the enlargement 13 of the valve member presented toward the outlet to tend to move the valve member 12 to the valve-closed position of FIG. 2, thereby increasing the loading of the spring 17. In the fully valve-closed position of FIG. 2 the end surface 20 of the valve member 12 remote from the enlargement 13 comes into contact with a central plug 21 of the adjustment facility 15,16, thereby closing off communication between the inlet 18 and the through passage 22 of the valve member 12. Thus if the supplied gas pressure exceeds a value which is set by adjustment of the nut 16 the valve will close, but as soon as pressure at the outlet 19 falls below that value the valve will be opened by the spring 17.

A disadvantage of this prior art regulator is that the valve member 12 is under the influence of gas pressure acting on its end surface 20 counter to pressure acting on its enlarged end 13 and tending to keep the valve member in the valve-open position. In conditions of extreme pressure variation this can lead to a phenomenon known as "spiking" or "shunting". In general the regulator is less sensitive to pressure variation than is desirable because of the counter force to which the valve member 12 is subject only when in the valve-open position.

A principal object of the present invention is to address this problem.

SUMMARY OF THE INVENTION

In accordance with the present invention there is provided a gas pressure regulator comprising a housing having inlet and outlet ports, a valve member moveable in a bore in the housing between positions opening and closing communication between the inlet and outlet and means biasing the valve member toward the valve open position, the valve member having a through passage for communicating the inlet with the outlet and a surface presented to the outlet such that downstream pressure on said surface will urge the valve member to the valve closed position against the action of the biasing means, characterised in that the inlet communicates with the through passage via gas admission means arranged such that upstream gas pressure acting on the valve member in the valve-opening direction is compensated by gas pressure acting on the valve member in the opposite direction.

In one embodiment of the present invention an end portion of the valve member remote from said surface presented to the outlet is tubular and receives a piston element as a gas-tight, sliding fit, the valve member having one or more lateral openings to said through passage at a position such that when the valve member is urged to the valve closed position said opening(s) will be obturated by said piston element and when in the valve open position said opening(s) will be spaced from said piston element allowing communication between the inlet and the through passage via said opening(s).

It will be understood that in this arrangement when the valve member is in the open position gas pressure is equal all around the or each opening so that the valve member is not influenced in any direction by upstream gas pressure.

In another embodiment of the present invention a spool is provided having one enlarged end having a fixed position within the through passage of the valve member and another enlarged end outside the valve member within the bore of the housing at a position spaced from the end of the valve member remote from said surface thereof presented to the outlet, said enlarged end within the through passage having one or more openings to allow communication between the inlet and the outlet therethrough and the total surface area of said enlarged end within the valve member and the end of the valve member remote from said surface thereof presented to the outlet is equal to the surface area of said enlarged end of the spool outside the valve member such that gas pressure acting on said end of the valve member is compensated by gas pressure acting on said enlarged end outside the valve member.

In this arrangement as in the prior art regulator of FIGS. 1 and 2 the valve member does have an end surface exposed to upstream gas pressure, but the effect of this in influencing the valve member in the valve-opening direction is cancelled by gas pressure acting on the enlarged end of the spool outside the valve member.

The valve member may be tubular and may have an enlarged end nearest to the outlet, said biasing means being a compression spring acting on the underside thereof.

Preferably the spring acts between said underside of the valve member enlargement and an adjustment means which surrounds the valve member, the adjustment means being moveable in the housing toward and away from the outlet to adjust the loading of the spring.

In this arrangement the piston element is preferably a component of the adjustment means and is moveable therewith.

The adjustment means may be moveable in the housing bore by means of an adjustment nut which engages screw threads in an end portion of the housing bore remote from the outlet.

BRIEF DESCRIPTION OF THE DRAWINGS

Preferred embodiments of the present invention will now be described by way of non-limitative example with reference to the accompanying drawings, in which.

DETAILED DESCRIPTION OF A PREFERRED EMBODIMENT

Figure 1:
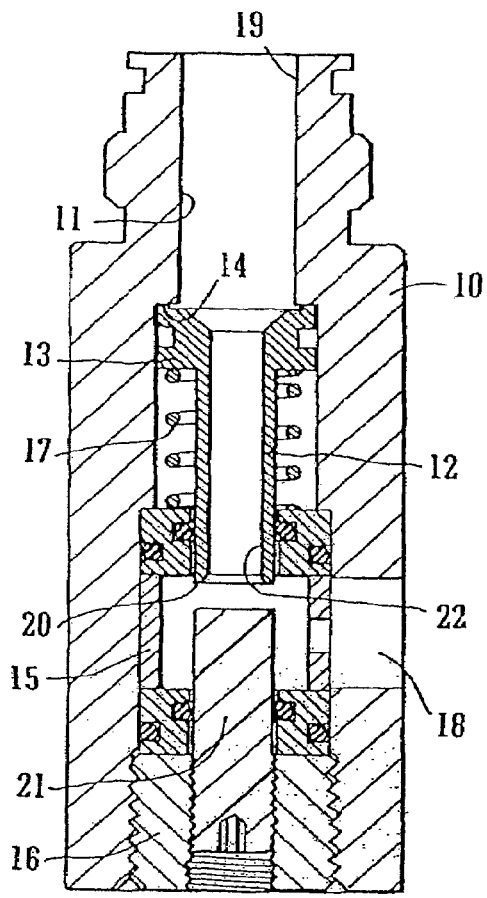
FIGS. 1 & 2 are sectional elevations of a prior art regulator as above described, respectively in the valve-open and valve closed position.
Figure 2:
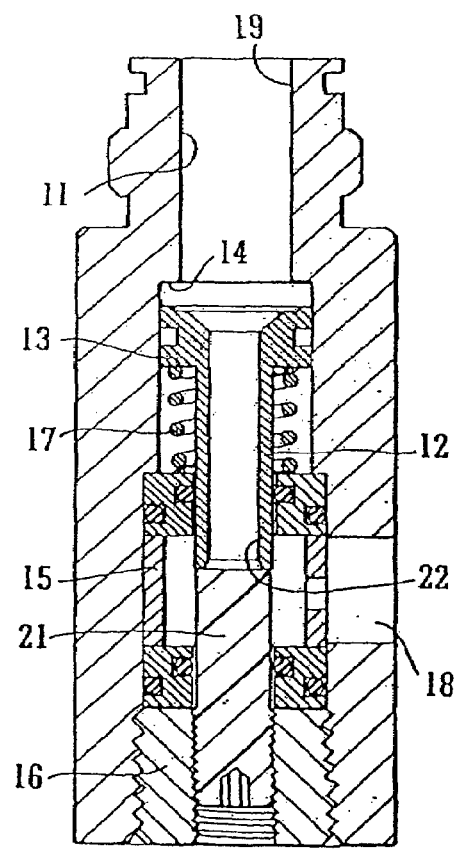
Figure 3:
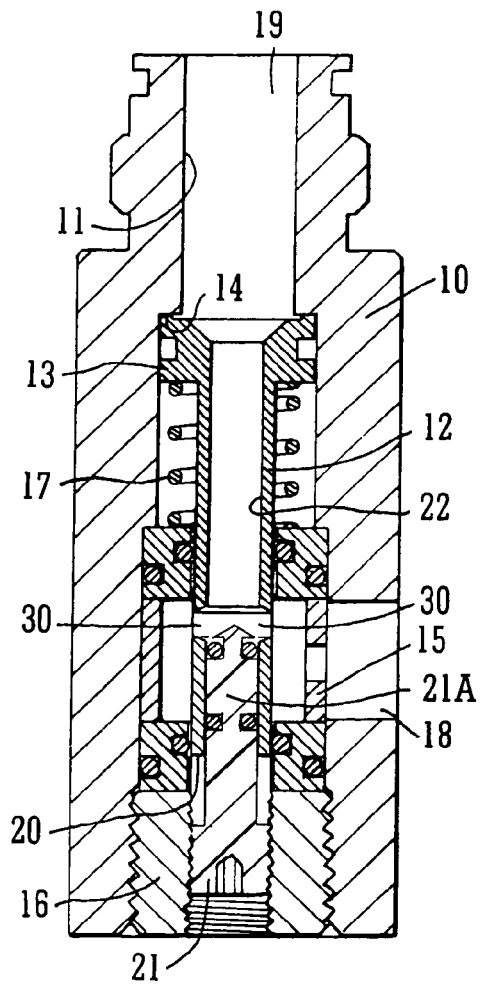
FIGS. 3 & 4 are sectional elevations of a first embodiment of a gas regulator in accordance with the invention, respectively in the valve-open and the valve-closed position.
Figure 4:
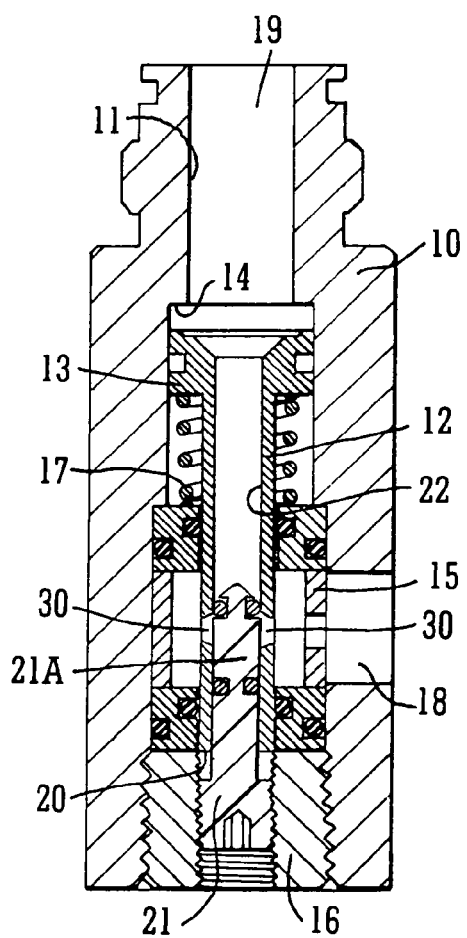
Figure 5:
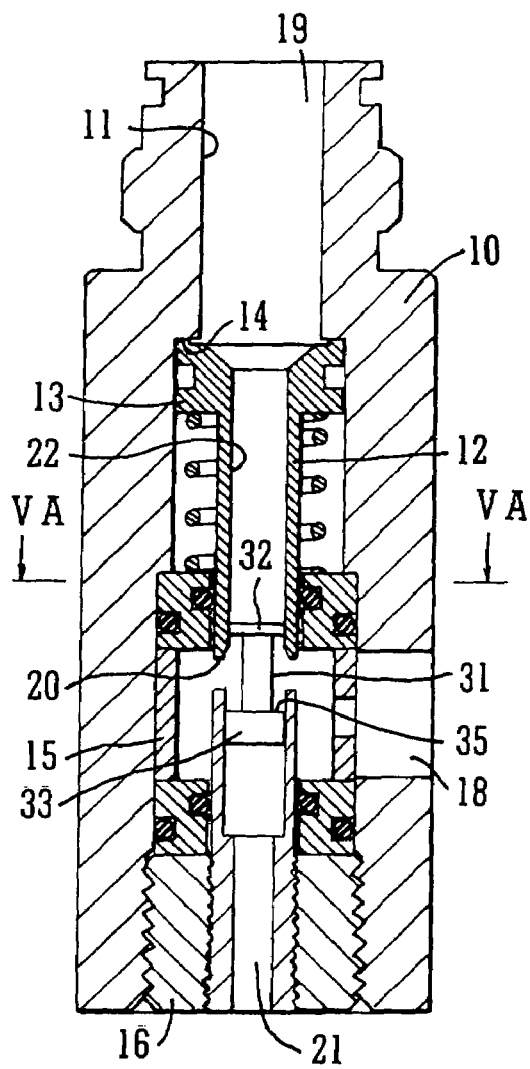
FIG. 5 is a sectional elevation of a second embodiment of a gas regulator in accordance with the present invention in the valve-open position.
Figure 5A:
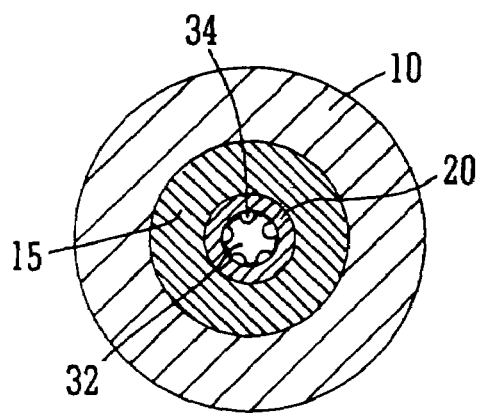
FIG. 5A is a view taken on the line VA-VA of FIG. 5.

So far as the regulators of FIGS. 3 and 4 and of FIGS. 5 and 5A resemble the regulator of FIGS. 1 and 2 like parts have been given like references. Each comprises a housing 10 having a through bore 11 in which a tubular valve member 12 is moveable between valve-open and valve-closed positions. The housing 10 has a lateral inlet 18 and the upper end 19 of the bore of the housing constitutes an outlet. A spring 17 is in compression between the underside of an enlargement 13 at the upper end of the valve member 12 and an adjustment cylinder 15 which surrounds the valve member within the bore 11, the cylinder being axially moveable by a nut 16 engaging screw threads at the lower end of the bore 11.

In the embodiment of FIGS. 3 and 4 the lower end 20 of the valve member 12 does not terminate above the plug 21. Instead a lower end portion of the valve member 12 receives an upper portion 21A of the plug as a gas-tight, sliding fit after the fashion of a piston. The wall of the tubular valve member 12 has openings 30 intermediate its ends at a position such that in the valve-open position of the valve member 12 (FIG. 3) the openings 30 are above and therefore unobstructed by the piston formation 21A but in the valve-closed position of the valve member 12 the openings 30 are occluded by the piston formation 21A.

In the valve-open position of the valve member 12 incoming pressurised gas from the inlet 18 acts equally in all directions around each opening 30 so that the valve member 12 is not influenced to move in any direction within the bore 11 by pressurised gas entering its through passage 22.

In the alternative embodiment of FIGS. 5 and 5A the lower end 20 of the valve member 12 does terminate above the plug 21, as in FIGS. 1 and 2, but a spool 31 is provided in the bore 11. The spool 31 has one enlarged end 32 having a fixed position within the through passage 22 of the valve member 12 and another enlarged end 33 which is a sliding fit in the bore 11 outside the valve member 12. The periphery of the enlarged end 32 is cut away as at 34 (FIG. 5A) to permit gas to pass it. Alternatively openings in the enlarged end 32 may be provided.

The combined surface areas of the underside of the spool end 32 (i.e. minus the cut away areas) plus the surface area of the end 20 of the valve member 12 are equal to the surface area of the inwardly-presented side 35 of the spool end 33. Consequently the forces acting on these surfaces cancel each other out and compressed gas acting on the end surface 20 of the valve member 12 does not influence the latter in the valve-opening direction.

What is claimed is:

1. A gas pressure regulator comprising a housing having inlet and outlet ports, a valve member moveable in a bore in the housing between positions opening and closing communication between the inlet and outlet and means biasing the valve member toward the valve open position, the valve member having a peripheral wall providing a through passage for communicating the inlet with the outlet and a surface presented to the outlet such that downstream pressure on said surface will urge the valve member to the valve closed position against the action of the biasing means, wherein an end portion of the valve member remote from said surface presented to the outlet is tubular and said tubular end portion slideably receives a piston element maintained in a gas-tight fit with said tubular end portion, the valve member having one or more lateral openings through said peripheral wall communicating with said through passage at a position such that when the valve member is urged to the valve closed position said opening(s) will be occluded by said piston element and when in the valve open position said opening(s) will be spaced from said piston element allowing communication between the inlet and the through passage via said opening(s).

2. A gas pressure regulator comprising a housing having inlet and outlet ports, a valve member moveable in a bore in the housing between positions opening and closing communication between the inlet and outlet and means biasing the valve member toward the valve open position, the valve member having a through passage for communicating the inlet with the outlet and a surface presented to the outlet such that downstream pressure on said surface will urge the valve member to the valve closed position against the action of the biasing means, wherein a spool is provided having one enlarged end having a fixed position within the through passage of the valve member and another enlarged end outside the valve member within the bore of the housing at a position spaced from the end of the valve member remote from said surface thereof presented to the outlet, said enlarged end within the through passage having one or more openings to allow communication between the inlet and the outlet therethrough and the total surface area of said enlarged end within the valve member and the end of the valve member remote from said surface thereof presented to the outlet is equal to the surface area of said enlarged end of the spool outside the valve member such that gas pressure acting on said end of the valve member is compensated by gas pressure acting on said enlarged end outside the valve member.

3. A regulator as claimed in claim 1 wherein the valve member is tubular and has an enlarged end nearest to the outlet (19), said biasing means being a compression spring acting on the underside thereof.

4. A regulator as claimed in claim 3, wherein the spring acts between said underside of the valve member enlargement and an adjustment means which surrounds the valve member, the adjustment means being moveable in the housing toward and away from the outlet to adjust the loading of the spring.

5. A gas pressure regulator comprising a housing having inlet and outlet ports, a valve member moveable in a bore in the housing between positions opening and closing communication between the inlet and outlet and means biasing the valve member toward the valve open position, the valve member having a peripheral wall providing a through passage for communicating the inlet with the outlet and a surface presented to the outlet such that downstream pressure on said surface will urge the valve member to the valve closed position against the action of the biasing means wherein an end portion of the valve member remote from said surface presented to the outlet is tubular and receives a piston element as a gas-tight, sliding fit, the valve member having one or more lateral openings through said peripheral wall communicating with said through passage at a position such that when the valve member is urged to the valve closed position said opening(s) will be occluded by said piston element and when in the valve open position said opening(s) will be spaced from said piston element allowing communication between the inlet and the through passage via said opening(s), wherein the valve member is tubular and has an enlarged end nearest to the outlet, said biasing means being a compression spring acting on the underside thereof and wherein the spring acts between said underside of the valve member enlargement and an adjustment means which surrounds the valve member, the adjustment means being moveable in the housing toward and away from the outlet to adjust the loading of the spring, and wherein the adjustment means is moveable in the housing bore by means of an adjustment nut which engages screw threads in an end portion of the housing bore remote from the outlet.

6. A gas pressure regulator according to claim 1, wherein the inlet port extends through a first wall of the housing and the outlet port extends through a second wall of the housing, the two walls being orthogonal.

\* \* \* \* \*

UNITED STATES PATENT AND TRADEMARK OFFICE
CERTIFICATE OF CORRECTION

PATENT NO. : 7,575,021 B2 Page 1 of 1
APPLICATION NO. : 11/294120
DATED : August 18, 2009
INVENTOR(S) : Martin Carnall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 127 days.

Signed and Sealed this

Seventh Day of September, 2010

David J. Kappos
*Director of the United States Patent and Trademark Office*